(12) United States Patent
Cao et al.

(10) Patent No.: US 12,306,118 B2
(45) Date of Patent: May 20, 2025

(54) BACKSCATTER X-RAY SYSTEM

(71) Applicant: SHENZHEN XPECTVISION TECHNOLOGY CO., LTD., Shenzhen (CN)

(72) Inventors: Peiyan Cao, Shenzhen (CN); Yurun Liu, Shenzhen (CN)

(73) Assignee: SHENZHEN XPECTVISION TECHNOLOGY CO., LTD., Shenzhen (CN)

( * ) Notice: Subject to any disclaimer, the term of this patent is extended or adjusted under 35 U.S.C. 154(b) by 718 days.

(21) Appl. No.: 17/236,486

(22) Filed: Apr. 21, 2021

(65) Prior Publication Data

US 2021/0239628 A1    Aug. 5, 2021

Related U.S. Application Data

(63) Continuation of application No. PCT/CN2018/114124, filed on Nov. 6, 2018.

(51) Int. Cl.
*G01N 23/203*    (2006.01)
*G01N 23/20*    (2018.01)

(52) U.S. Cl.
CPC ..... *G01N 23/203* (2013.01); *G01N 23/20083* (2013.01); *G01N 2223/301* (2013.01)

(58) Field of Classification Search
None
See application file for complete search history.

(56) References Cited

U.S. PATENT DOCUMENTS

| | | | | |
|---|---|---|---|---|
| 4,017,185 A * | 4/1977 | Chupp | | G01J 3/18 |
| | | | | 356/333 |
| 6,094,472 A | 7/2000 | Smith | | |
| 8,917,927 B2 * | 12/2014 | Song | | G01V 5/0016 |
| | | | | 378/70 |
| 2008/0179502 A1 * | 7/2008 | Ledoux | | G01N 23/20 |
| | | | | 250/216 |
| 2011/0075808 A1 | 3/2011 | Rothschild et al. | | |
| 2011/0235777 A1 | 9/2011 | Gozani et al. | | |
| 2013/0315368 A1 * | 11/2013 | Turner | | G01N 23/203 |
| | | | | 378/87 |
| 2014/0169528 A1 * | 6/2014 | Bethke | | G01N 23/20091 |
| | | | | 378/88 |
| 2015/0297156 A1 * | 10/2015 | Annis | | G01N 23/203 |
| | | | | 378/87 |
| 2017/0219501 A1 | 8/2017 | Yakimov et al. | | |

FOREIGN PATENT DOCUMENTS

| | | |
|---|---|---|
| CN | 202854352 U | 4/2013 |
| WO | 2012000298 A1 | 1/2012 |
| WO | 2016154044 A1 | 9/2016 |

OTHER PUBLICATIONS

Grubsky, Victor, et al. "Compton imaging tomography technique for NDE of large nonuniform structures." Penetrating Radiation Systems and Applications XII. vol. 8144. SPIE, 2011.

* cited by examiner

*Primary Examiner* — Hoon K Song
(74) *Attorney, Agent, or Firm* — IPro, PLLC

(57) ABSTRACT

Disclosed herein is a backscatter X-ray system comprising: an X-ray source configured to scan a sheet of X-ray across an object, wherein the sheet of X-ray illuminates one line on a surface of the object; a sensor configured to differentiate backscattered X-ray from different spots along the line.

17 Claims, 13 Drawing Sheets

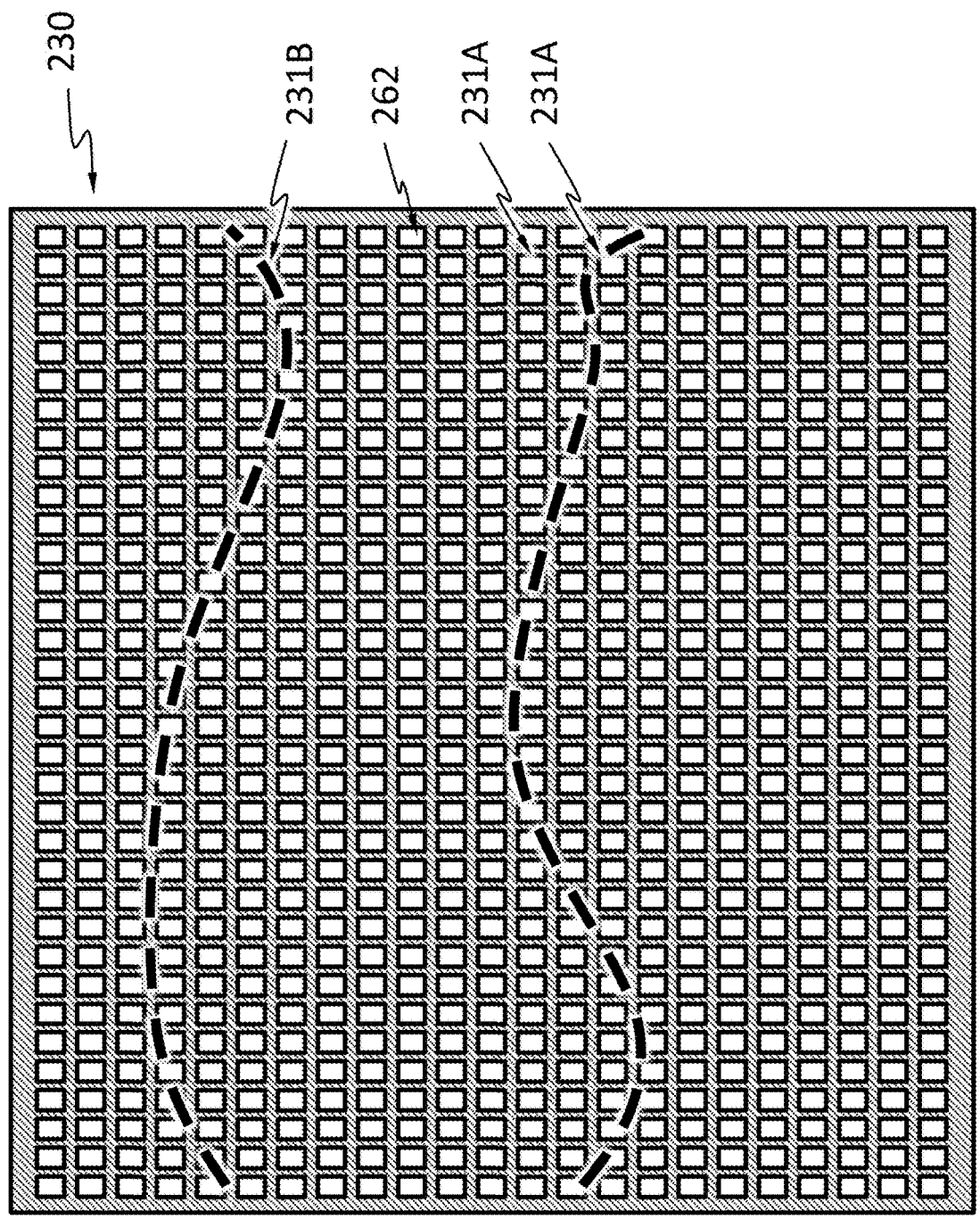

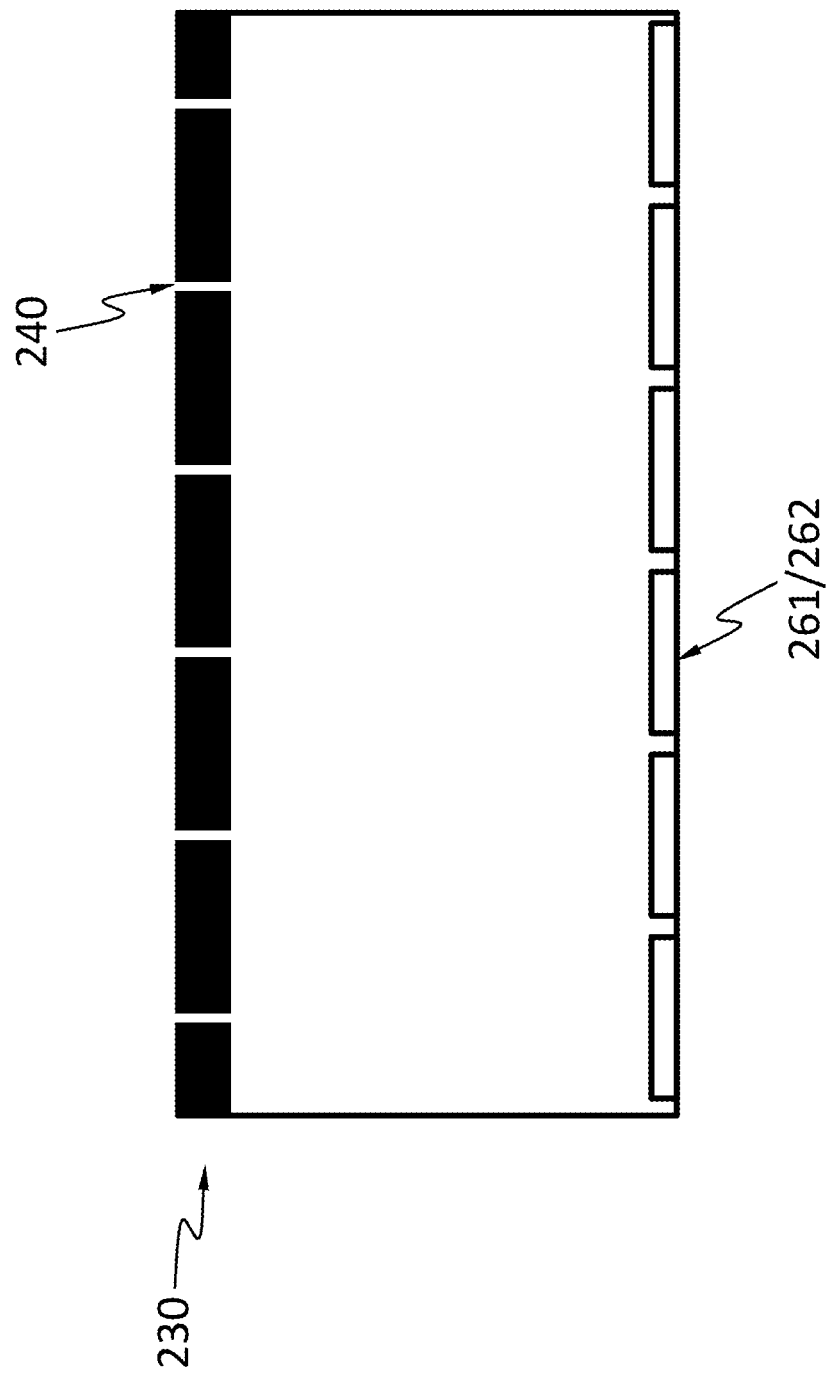

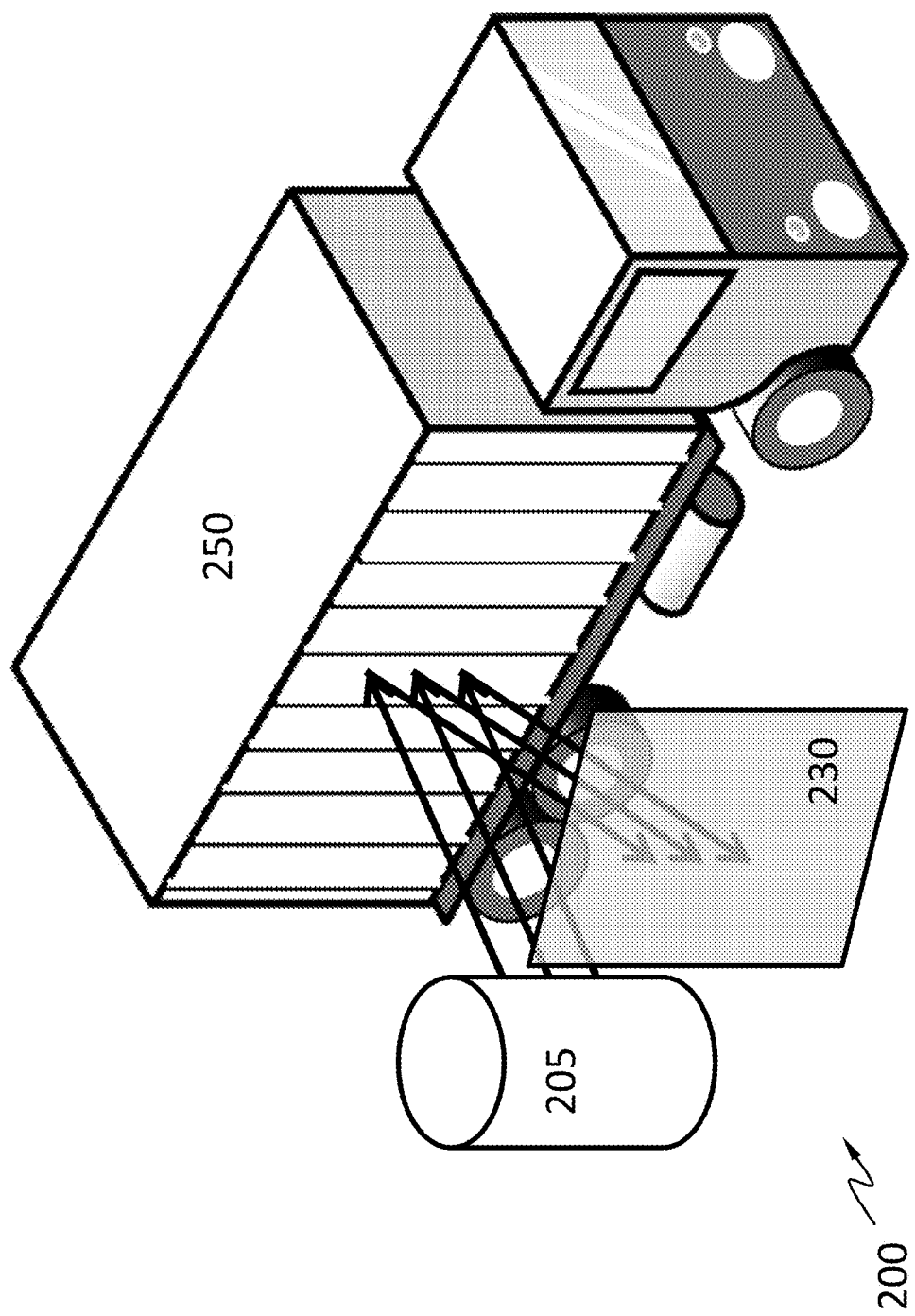

BACKSCATTER X-RAY SYSTEM

TECHNICAL FIELD

The disclosure herein relates to a system for backscatter X-ray.

BACKGROUND

X-ray detectors may be devices used to measure the flux, spatial distribution, spectrum or other properties of X-rays. X-ray detectors may be used for many applications. One important application is imaging. X-ray imaging is a radiography technique and can be used to reveal the internal structure of a non-uniformly composed and opaque object such as the human body.

SUMMARY

Disclosed herein is a backscatter X-ray system comprising: an X-ray source configured to scan a sheet of X-ray across an object, wherein the sheet of X-ray illuminates one line on a surface of the object; a sensor configured to differentiate backscattered X-ray from different spots along the line.

According to an embodiment, the X-ray source comprises a slit.

According to an embodiment, the sheet of X-ray is scanned across the object by moving the slit or moving the object.

According to an embodiment, the sheet is not planar.

According to an embodiment, the line is curved.

According to an embodiment, nothing on the surface of the object is illuminated by X-ray from the X-ray source except the one line.

According to an embodiment, the sensor comprises a slit.

According to an embodiment, the slit is not straight.

According to an embodiment, the sensor collects backscattered X-ray from different spots along the line using different portions of the sensor.

According to an embodiment, the different portions are different lines on the sensor.

According to an embodiment, the different lines on the sensor are not straight.

According to an embodiment, the X-ray source comprises a slit and the portions are respective projections of the slit by backscattered X-ray from the spots.

According to an embodiment, the sensor comprises a plurality of pixel lines.

According to an embodiment, the sensor comprises a plurality of pixel spots.

According to an embodiment, the sensor comprises multiple slits.

According to an embodiment, the sensor comprises a layer of a material opaque to the backscattered X-ray.

According to an embodiment, the slit is configured to limit angles of the backscattered X-ray that reach the sensor.

Disclosed herein is a cargo scanning or non-intrusive inspection (NII) system comprising any of the above backscatter X-ray systems.

Disclosed herein is a full-body scanner system comprising any of the above backscatter X-ray systems.

BRIEF DESCRIPTION OF FIGURES

FIG. 5 shows a configuration of the sensor having a series of independent pixel spots.

FIG. 7A schematically shows the sensor, according to an embodiment.

FIG. 8 schematically shows a cargo scanning or non-intrusive inspection (NII) system comprising the backscatter X-ray system described herein, according to an embodiment.

DETAILED DESCRIPTION

Backscatter X-ray is one type of X-ray imaging. Traditional X-ray imaging systems detect hard and soft materials by the variation in transmission through an object. In contrast, backscatter X-ray detects the radiation that reflects from an object. It has potential applications where less-destructive examination is needed, and can be used if only one side of the object is available for examination.

Backscatter X-ray is based on the X-ray Compton scattering effect. Unlike X-ray imaging systems, which rely on the transmission of X-ray through the object, backscatter X-ray detects the radiation that reflects from the object and forms an image. The backscatter pattern is dependent on the material property.

Compton scattering is the inelastic scattering of a photon by a charged particle, such as an electron. Compton scattering results in a decrease in energy (increase in wavelength) of the photon (e.g., an X-ray photon).

Figure 1:
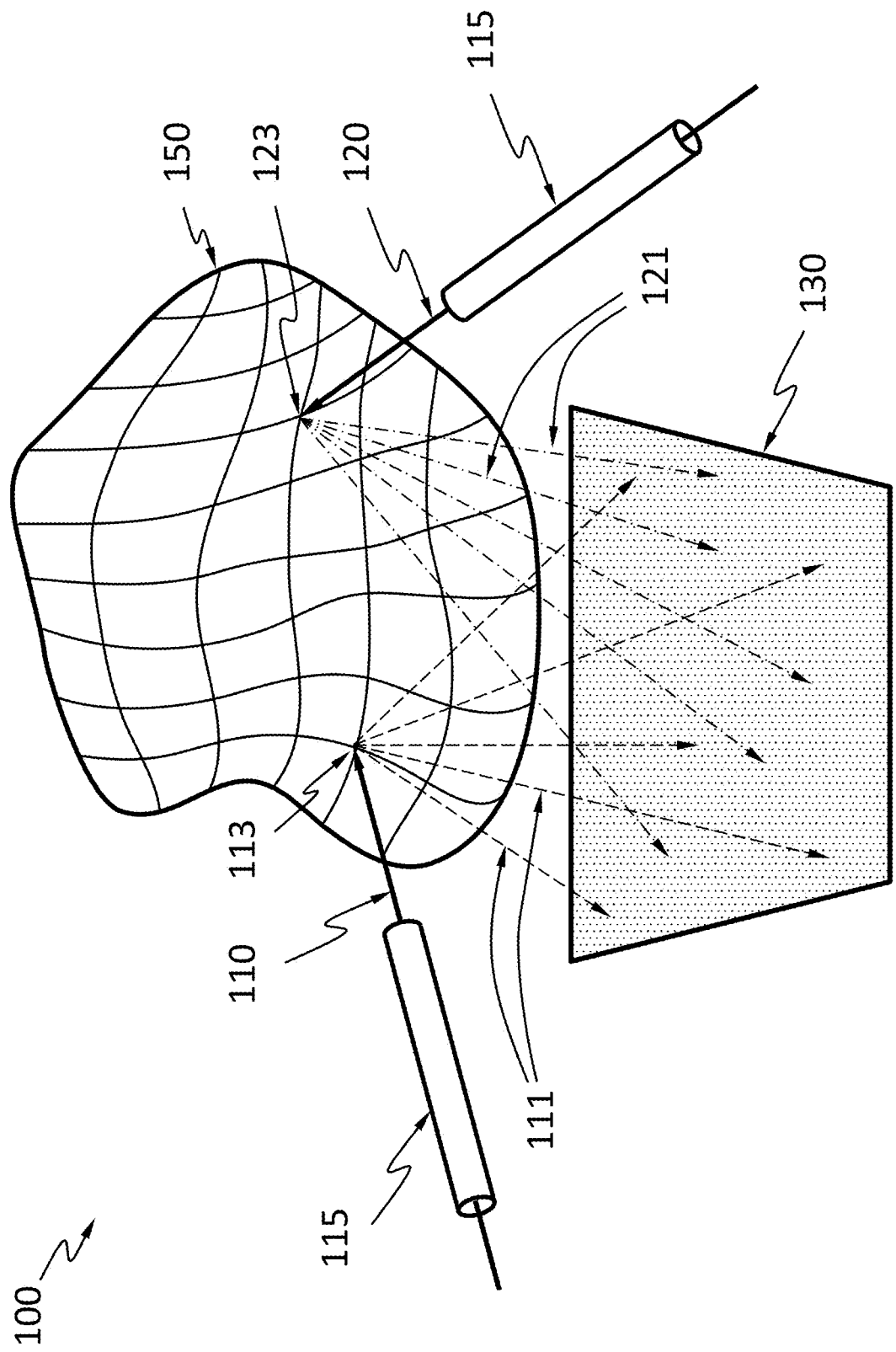
FIG. 1 schematically shows a backscatter X-ray system.

FIG. 1 schematically shows a backscatter X-ray system 100. A narrow X-ray beam (e.g., beam 110 and beam 120) is scanned across an object 150. The narrow X-ray beam may be generated using a collimator 115. The beam may be scanned by moving (e.g., rotating) the collimator 115. As the beam is scanned across the object 150, various spots on the surface of the object 150 are illuminated by the beam while the rest of the surface of the object 150 is not illuminated. Backscattered X-ray can only be from a spot illuminated by the beam. Therefore, any backscattered X-ray collected by a detector 130 at a given time can only be from the spot illuminated by the beam at that time. The detector 130 may be configured to collect backscattered X-ray propagating in many different directions because backscattered X-ray is not particularly directional. For example, the detector 130 can have a large area or be placed near the object. The detector 130 does not have to have a high spatial resolution. The spatial resolution of the backscatter X-ray system is achieved by the narrowness of the beam. In the example in FIG. 1, beam 110 illuminates a spot 113 on the surface of the object 150. Backscattered X-ray 111 from the spot 113 can propagate in many directions and at least some of the backscattered X-ray 111 is collected by the detector 130. Beam 120 illuminates a spot 113 on the surface of the object 150. Backscattered X-ray 121 from the spot 123 can propagate in many directions and at least some of the backscattered X-ray 121 is collected by the detector 130.

Figure 2A:
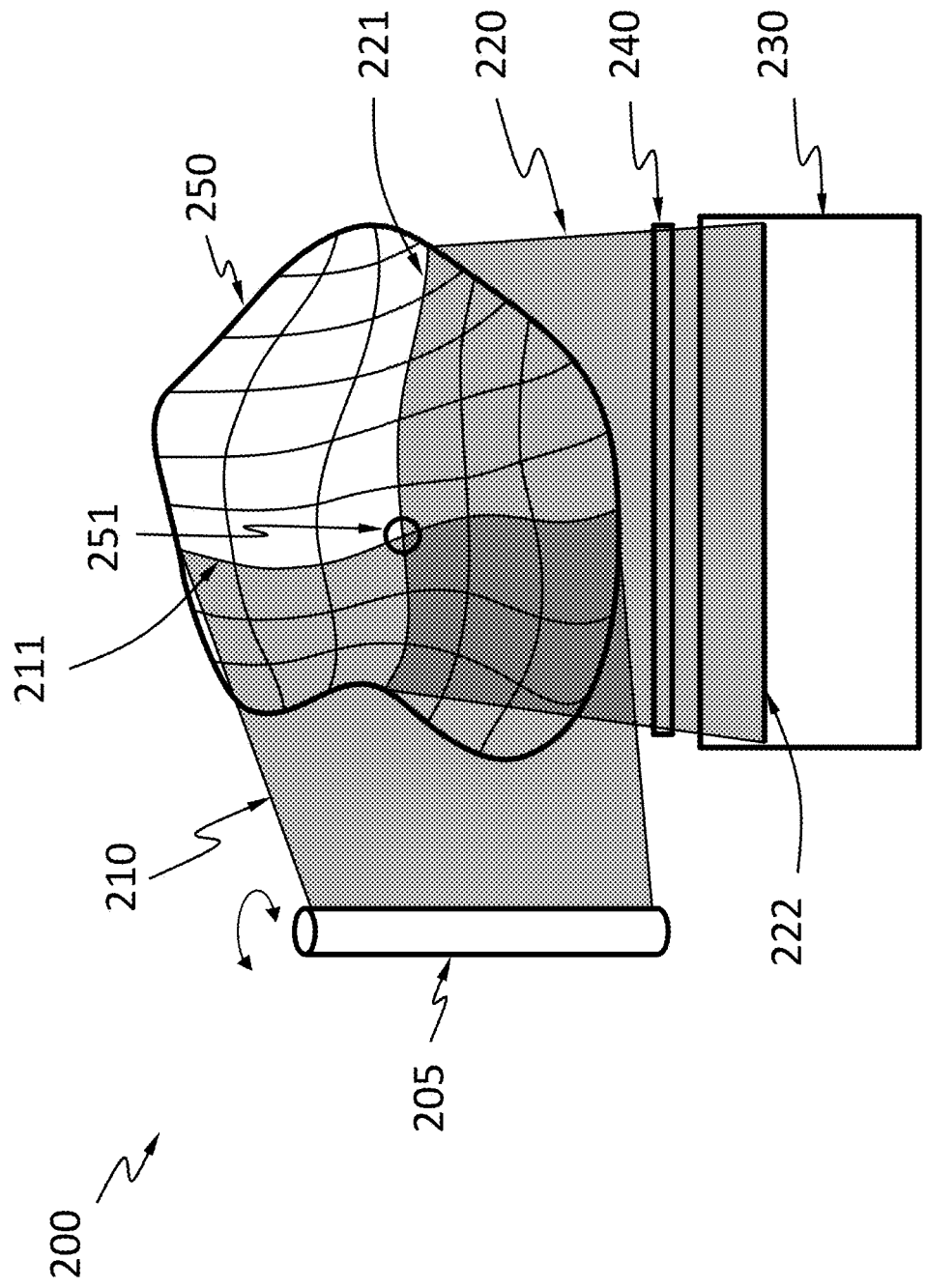
FIG. 2A schematically shows a backscatter X-ray system, according to an embodiment.
Figure 2B:
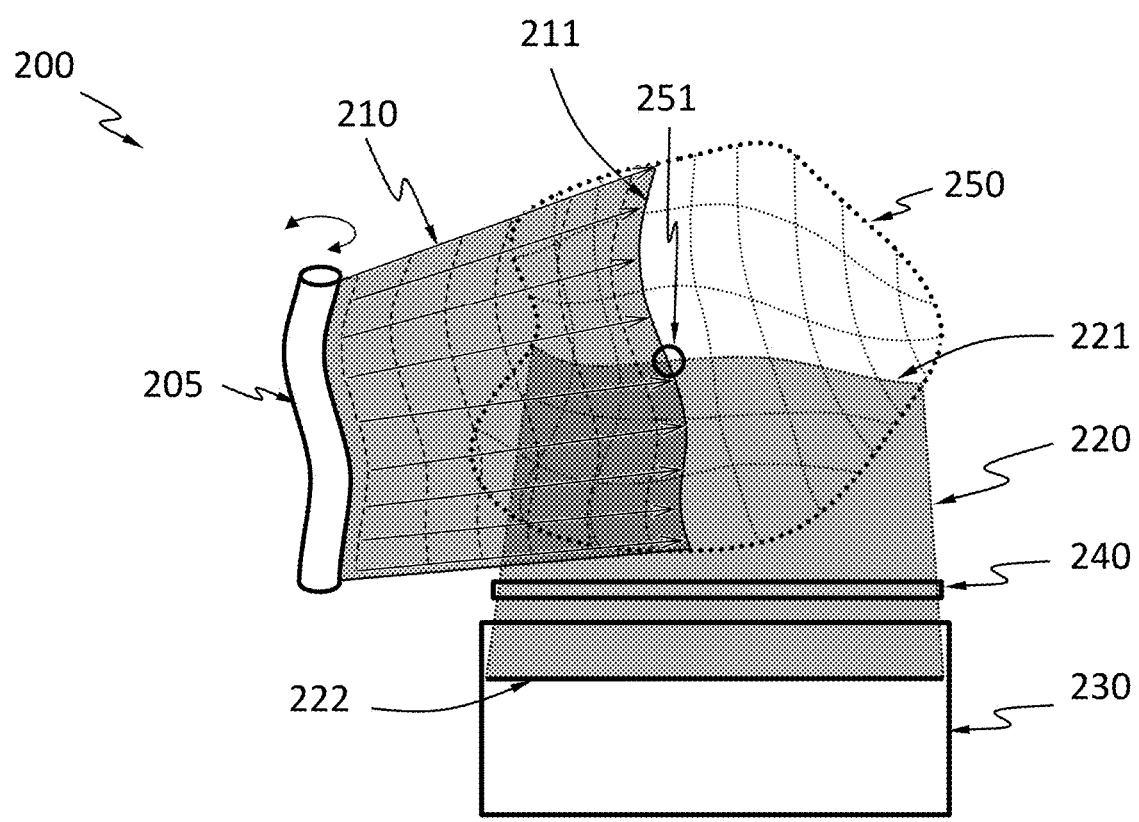
FIG. 2B schematically shows that the sheet of X-ray from the X-ray source of the backscatter X-ray system may be non-planar.

FIG. 2A schematically shows a backscatter X-ray system 200, according to an embodiment. At least a sheet of X-ray 210 from an X-ray source 205 is scanned across the object 150. For example, the sheet of X-ray 210 may be generated using a slit of the X-ray source 205. The beam may be scanned by moving (e.g., rotating) the slit, or moving the object 150. The word "sheet" here means a surface essentially on which the X-ray 210 propagates. The surface does not have to be planar, as schematically shown in FIG. 2B. The X-ray 210 is on a surface when and only when the X-ray 210 illuminates one line 211 (straight or curved) on the object 150 at a time. As the sheet of X-ray 210 is scanned across the object 150, various lines 211 on the surface of the object 150 are illuminated by the X-ray 210 while the rest of the surface of the object 150 is not illuminated. Backscattered X-ray can only be from a spot illuminated by the X-ray 210, namely only from a spot along the line 211 illuminated by the X-ray 210. Therefore, any backscattered X-ray collected by a sensor 230 at a given time can only be from a spot along the line 211. The sensor 230 is configured to differentiate backscattered X-ray from different spots along the line 211. For example, the sensor 230 may include a slit 240. There may be multiple surfaces 220 that pass through the slit 240. Each of the surfaces intercepts the object 150 at a line 221 and intercepts the sensor 230 at a line 222. Backscattered X-ray collected at the line 222 can thus only be from the line 221 on the object 150. Because only the line 211 on the object 150 is illuminated, backscattered X-ray collected at the line 222 can only be from the spot 251 at the intersection of the line 221 and the line 211. The sensor 230 does not have to have a high spatial resolution along the line 222. The spatial resolution of the backscatter X-ray system is achieved by both the sheet of X-ray 210 and the sensor 230. Backscattered X-ray collected at different lines 222 is from different spots on the line 211.

Figure 3:
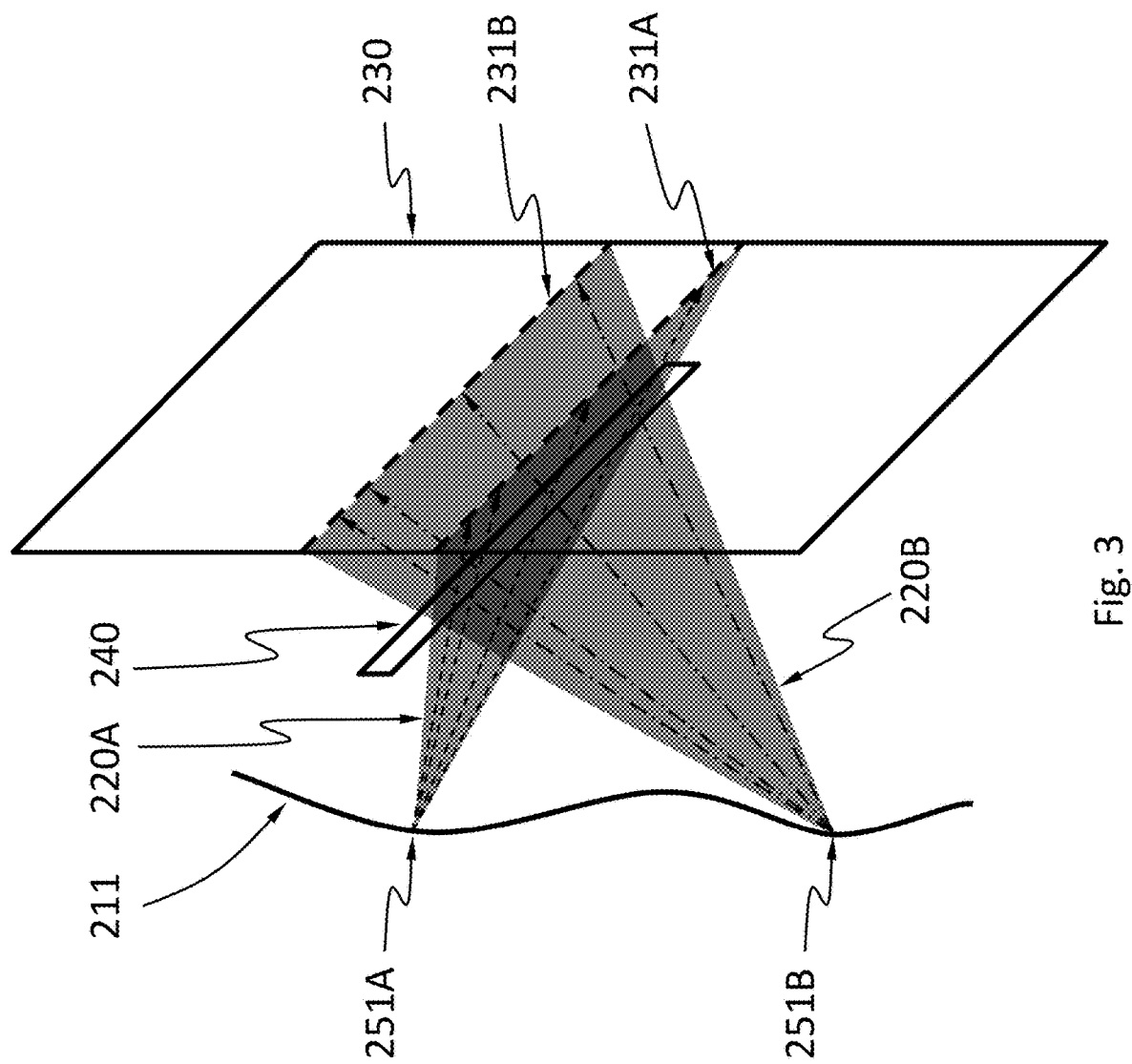
FIG. 3 illustrates how the sensor of the backscatter X-ray system of FIG. 2A differentiates backscatter X-ray from different spots on a line on the surface of an object.

FIG. 3 further illustrates how the sensor 230 differentiates backscatter X-ray from different spots on the line 211 on the surface of the object 250. In this example, the slit 240 is a straight slit because it is easier to explain how the system 200 works. The slit 240 is not necessarily always straight. Backscattered X-ray from a spot 251A on the line 211 can reach the sensor 230 if the backscattered X-ray propagates along a direction such backscattered X-ray is not blocked by the slit 240. Namely, if backscattered X-ray from the spot 251A reaches the sensor 230, it is one surface 220A spanned by the spot 251A and the slit 240. The backscattered X-ray from the spot 251A can reach a line 231A on the sensor through the slit 240, where the line 231A is a projection of the slit 240 by then backscattered X-ray from the spot 251A. Similarly, backscattered X-ray from a spot 251B on the line 211 can reach the sensor 230 if the backscattered X-ray propagates along a direction such backscattered X-ray is not blocked by the slit 240. Namely, if backscattered X-ray from the spot 251B reaches the sensor 230, it is one surface 220B spanned by the spot 251B and the slit 240. The backscattered X-ray from the spot 251B can reach a line 231B on the sensor through the slit 240, where the line 231B is a projection of the slit 240 by then backscattered X-ray from the spot 251B. If X-ray collected at the line 231A and X-ray collected at the line 231B can be distinguished, the backscatter X-ray from spots 251A and 251B can be differentiated. In this example depicted in FIG. 3, both the lines 231A and 231B are straight because the slit 240 is straight and the sensor 230 is planar. The line 211, as shown in the example of FIG. 3, does not have to be straight.

The sensor 230 may distinguish X-ray collected at different lines (e.g., 231A and 231B) with a variety of configurations.

Figure 4:
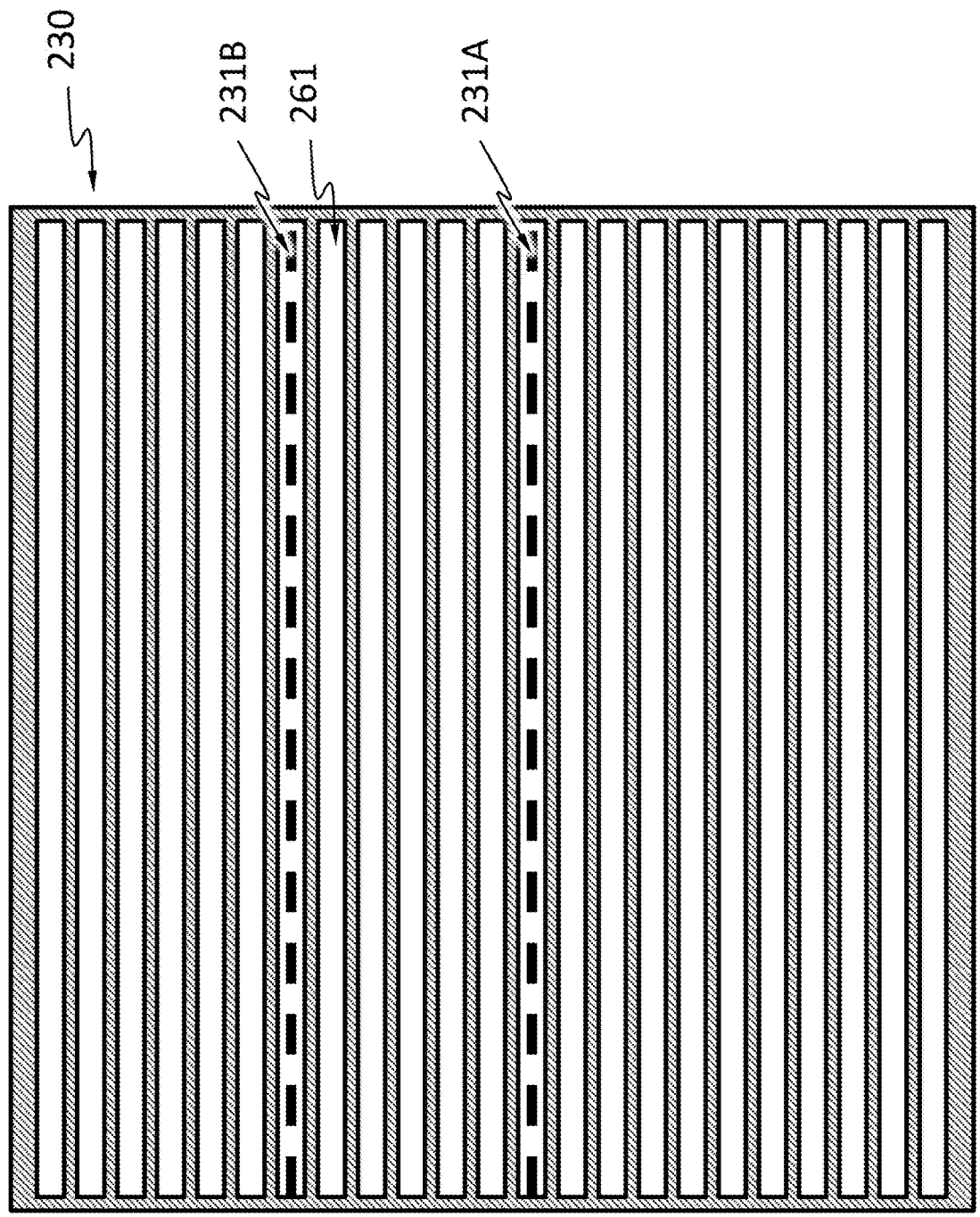
FIG. 4 shows a configuration of the sensor having a series of independent pixel lines.

For example, when the slit 240 is straight, backscattered X-ray from a spot (e.g., 251A) on the line 211 (which is straight in this example) on the object 250 is on a plane (e.g., 220A) spanned by the spot and the slit 240 and reaches a straight line (e.g., 231A) on the sensor 230. FIG. 4 shows a configuration of the sensor 230 having a series of independent pixel lines 261 extending in a direction parallel to the straight line (e.g., 231A) on the sensor. Each of the pixel lines 261 can collect X-ray reaching that pixel line independently from the other pixel lines. Namely, the pixel lines 261 can collect and distinguish backscattered X-ray from a series of spots on the line 211 on the surface of the object 250.

For example, no matter whether the slit 240 is straight, backscattered X-ray from a spot (e.g., 251A) on the line 211 (which may not be straight in this example) on the object 250 is on a surface (e.g., 220A, which may not be planar in this example) spanned by the spot and the slit 240 and reaches a line (e.g., 231A, which may not be straight in this example) on the sensor 230. FIG. 5 shows a configuration of the sensor 230 having a series of independent pixel spots 262. Each of the pixel spots 262 can collect X-ray reaching that pixel spot independently from the other pixel spots. The sum of the X-ray collected by the pixel spots 262 that the line 231A passes is the total amount of backscattered X-ray from spot 251A reaching the sensor 230.

Figure 6A:
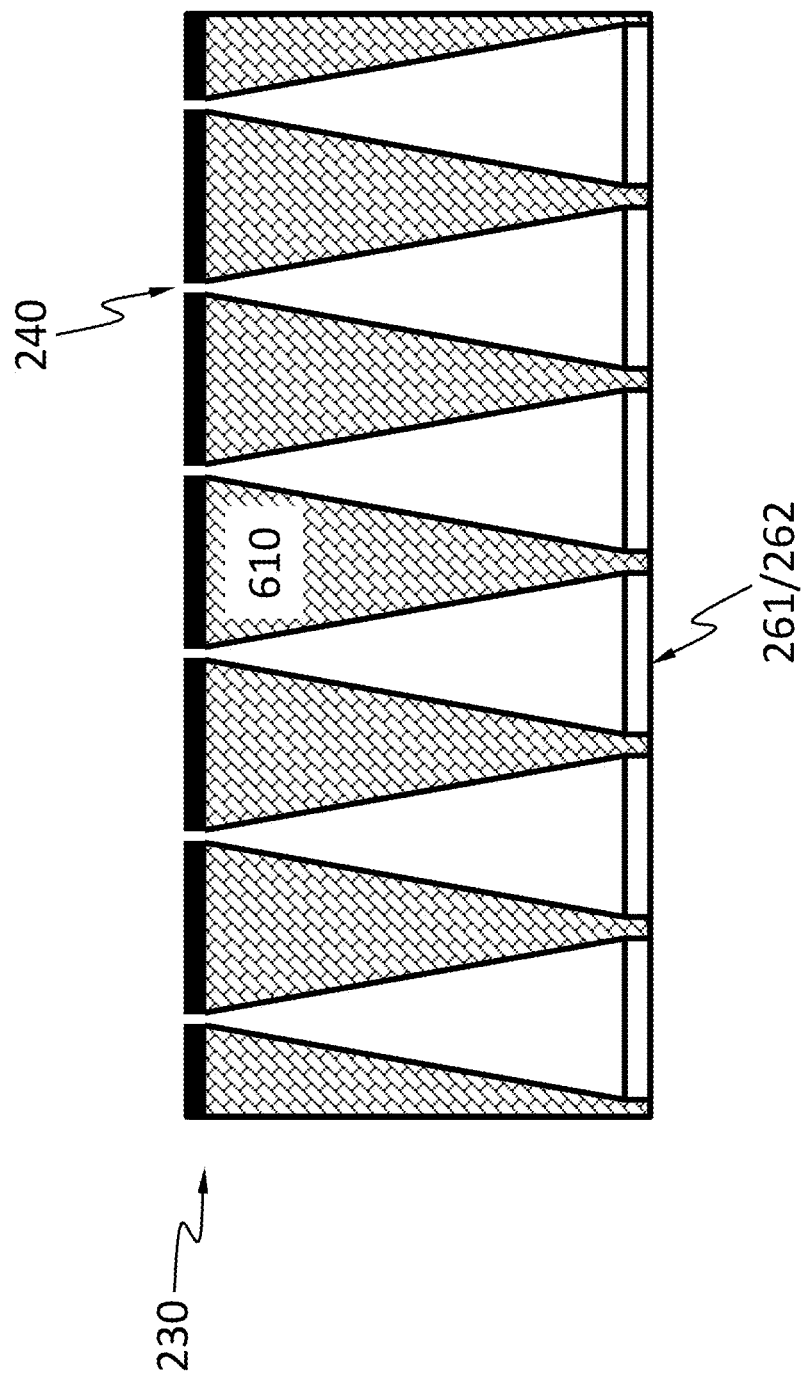
FIG. 6A schematically shows the sensor, according to an embodiment.
Figure 6B:
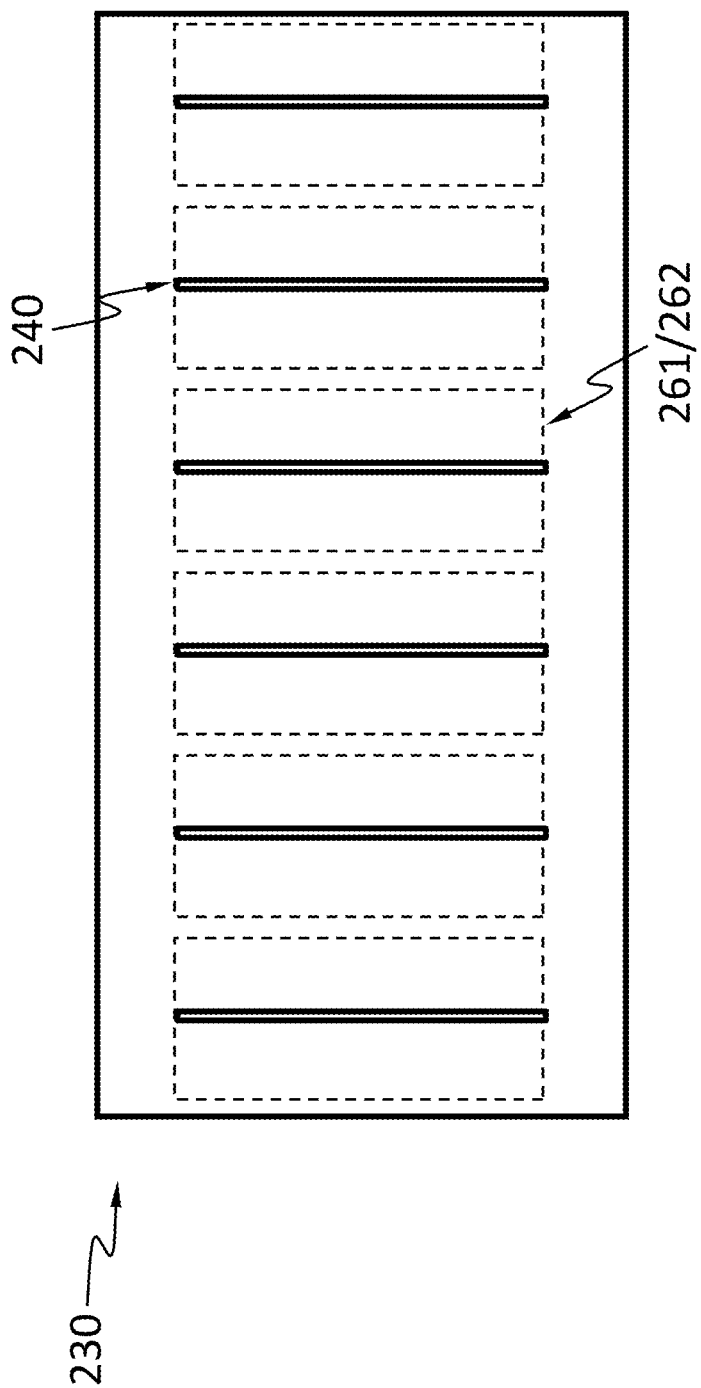
FIG. 6B schematically shows a top view of the sensor in FIG. 6A.

FIG. 6A schematically shows sensor 230, according to an embodiment. There may be multiple slits 240 in front of the sensor 230. The sensor 230 may have a layer 610 of a material opaque to the backscattered X-ray and the layer 610 may be configured to allow the scattered X-ray through the slits 240 at only certain angles to reach the pixel lines 261 or pixel spots 262. The multiple slits 240 may allow simultaneous collection of scattered X-ray from multiple spots on the line 211 on the surface of the object 250. FIG. 6B schematically shows a top view of the sensor 230 in FIG. 6A. The pixel lines 261 or pixel spots 262 are shown in dotted lines to show their positions relative to the slits 240 because pixel lines 261 or pixel spots 262 are not visible from the top view.

Figure 7B:
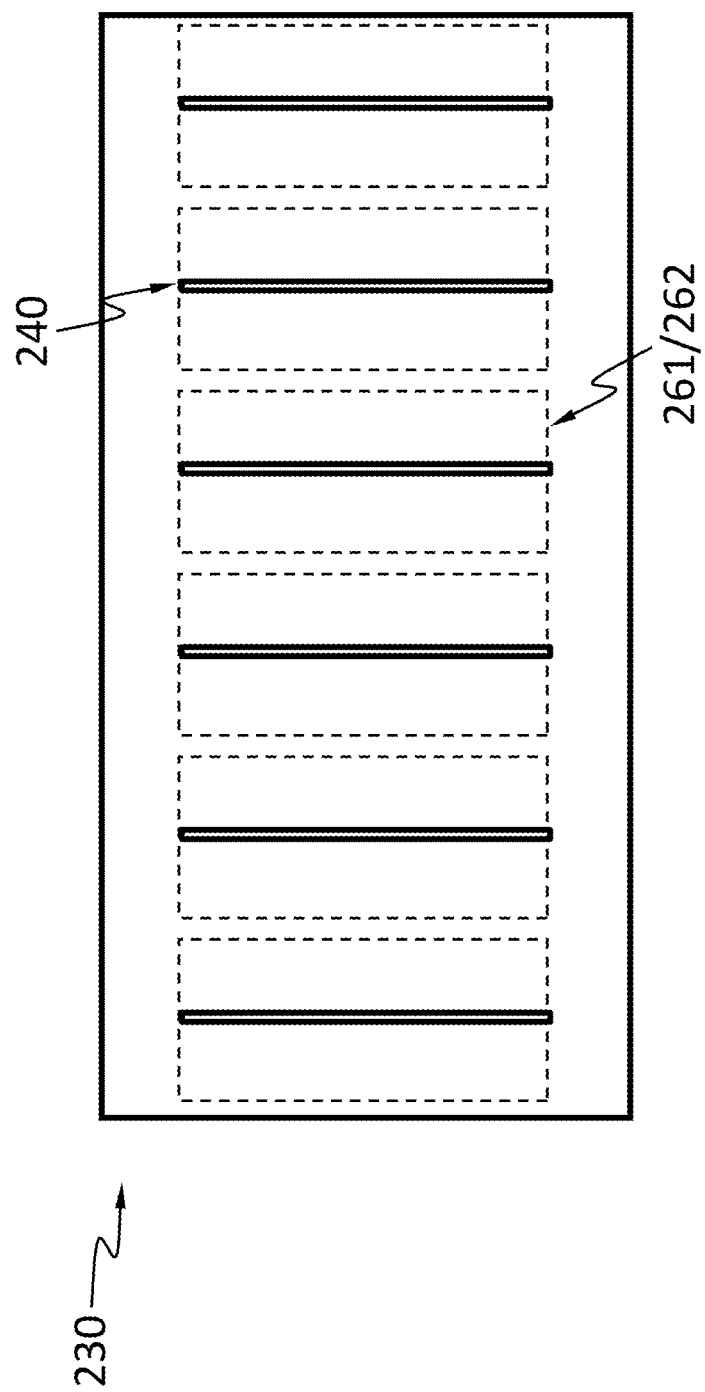
FIG. 7B schematically shows a top view of the sensor in FIG. 7A.
Figure 7C:
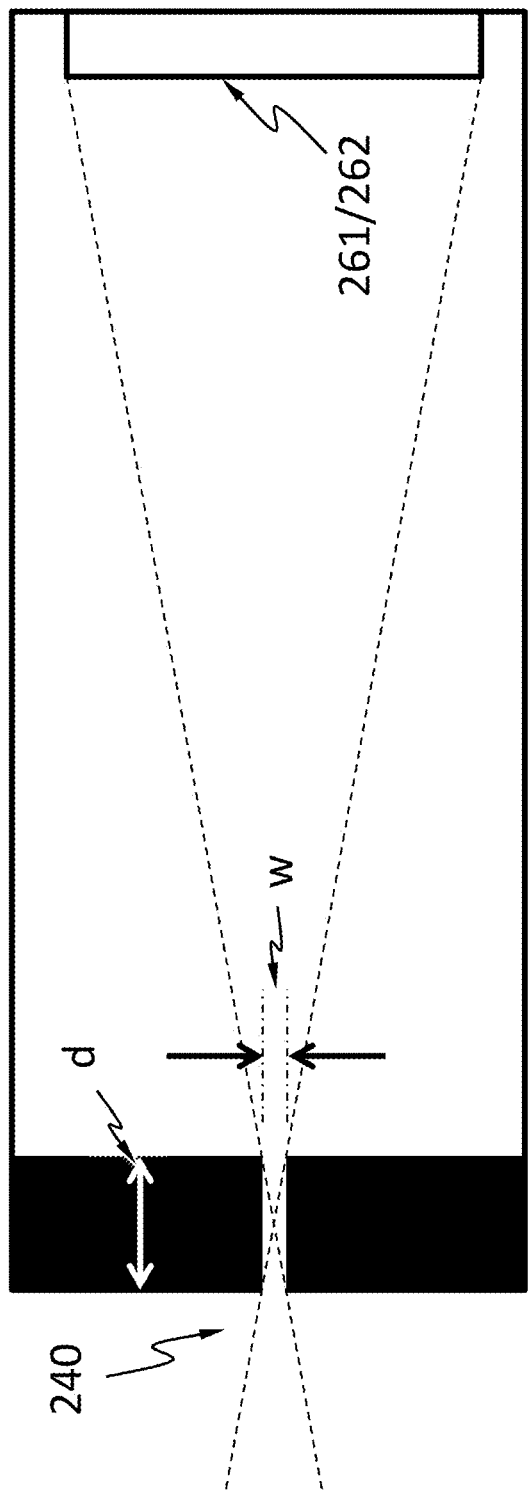
FIG. 7C schematically shows an example of the slits in front of the sensor of FIG. 7A.

FIG. 7A schematically shows sensor 230, according to an embodiment. There may be multiple slits 240 in front of the sensor 230. The sensor 230 may not have a layer of a material opaque to the scattered X-ray. The slits 240 may allow the scattered X-ray through the slits 240 at only certain angles to reach the pixel lines 261 or pixel spots 262 because of the geometrical shape of the slits 240. The multiple slits 240 may allow simultaneous collection of scattered X-ray from multiple spots on the line 211 on the surface of the object 250. FIG. 7B schematically shows a top view of the sensor 230 in FIG. 7A. The pixel lines 261 or pixel spots 262 are shown in dotted lines to show their positions relative to the slits 240 because pixel lines 261 or pixel spots 262 are not visible from the top view. FIG. 7C schematically shows an example of the slits 240 where the depth d and width w of the slits 240 block scattered X-ray beyond an angle of $\tan^{-1}(w/d)$.

FIG. 8 schematically shows a cargo scanning or non-intrusive inspection (NII) system comprising the backscatter X-ray system 200 described herein. The NII system may be used for inspecting and identifying goods in transportation systems such as shipping containers, vehicles, ships, luggage, etc. X-ray emitted from the X-ray source 205 may backscatter from an object 250 (e.g., shipping containers, vehicles, ships, etc.) and be projected to the sensor 230. Different internal structures of the object 250 may backscatter X-ray differently. The sensor 230 forms an image by detecting the intensity distribution of the backscattered X-ray and/or energies of the backscattered X-ray photons.

Figure 9:
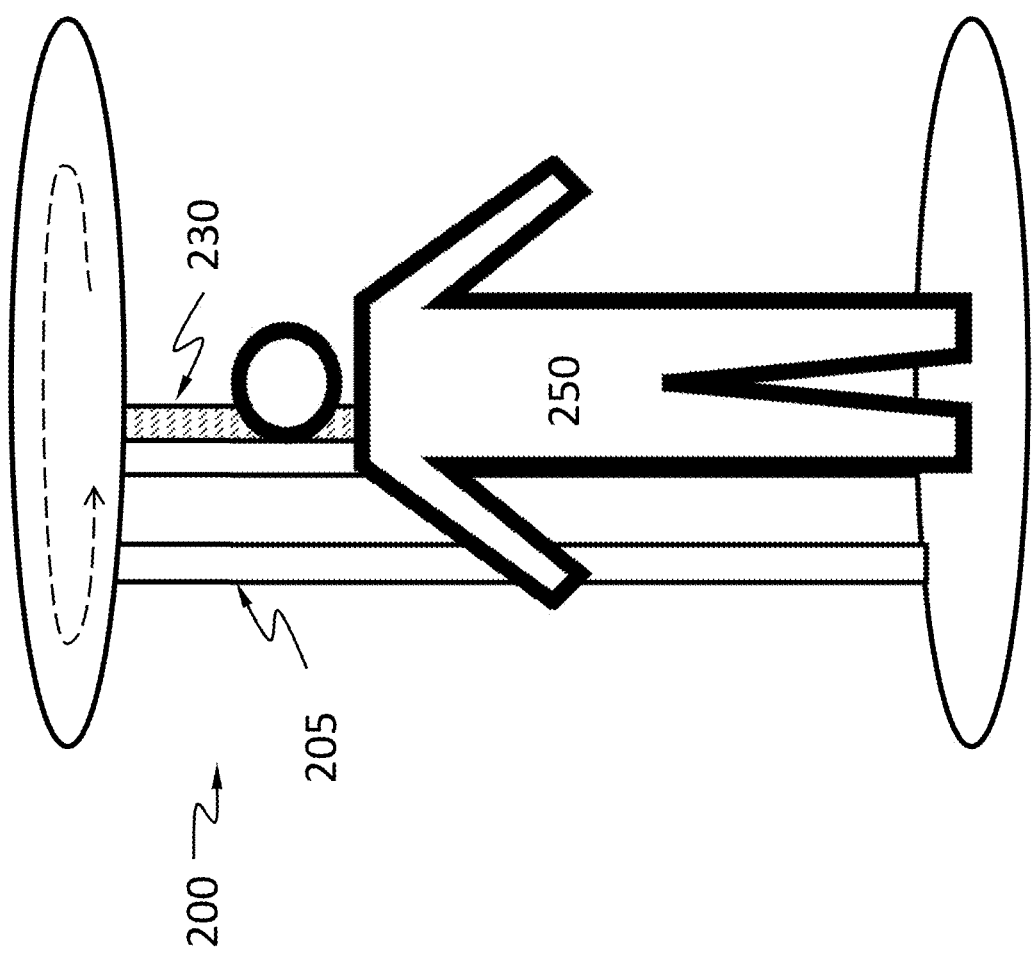
FIG. 9 schematically shows a full-body scanner system comprising the backscatter X-ray system described herein, according to an embodiment.

FIG. 9 schematically shows a full-body scanner system comprising the backscatter X-ray system 200 described herein. The full-body scanner system may detect objects on a person's body for security screening purposes, without physically removing clothes or making physical contact. The full-body scanner system may be able to detect non-metal objects. X-ray emitted from the X-ray source 205 may backscatter from an object 250 (e.g., a person being screened), and be projected to the sensor 230. Different parts of the object 250 may backscatter X-ray differently. The sensor 230 forms an image by detecting the intensity distribution of the backscattered X-ray. The backscatter X-ray system 200 may be configured to scan the human in a linear or rotational direction.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
an X-ray source configured to scan a sheet of X-ray across an object, wherein the sheet of X-ray illuminates one line on a surface of the object;
a sensor configured to differentiate backscattered X-ray from different spots along the line;
wherein the sensor collects backscattered X-ray from different spots along the line using different portions of the sensor;
wherein the different portions are different lines on the sensor.

2. The system of claim 1, wherein the X-ray source comprises a slit.

3. The system of claim 2, wherein the sheet of X-ray is scanned across the object by moving the slit or moving the object.

4. The system of claim 1, wherein the sheet is not planar.

5. The system of claim 1, wherein the line is curved.

6. The system of claim 1, wherein nothing on the surface of the object is illuminated by X-ray from the X-ray source except the line.

7. The system of claim 1, wherein the sensor comprises a slit.

8. The system of claim 7, wherein the slit is straight.

9. The system of claim 1, wherein the different lines on the sensor are not straight.

10. The system of claim 1, wherein the sensor comprises a slit and the portions are respective projections of the slit by backscattered X-ray from the spots.

11. The system of claim 1, wherein the sensor comprises a plurality of pixel lines.

12. The system of claim 1, wherein the sensor comprises a plurality of pixel spots.

13. The system of claim 7, wherein the sensor comprises multiple slits.

14. The system of claim 1, wherein the sensor comprises a layer of a material opaque to the backscattered X-ray.

15. The system of claim 7, wherein the slit is configured to limit angles of the backscattered X-ray that reach the sensor.

16. A cargo scanning or non-intrusive inspection (NII) system comprising the system of claim 1.

17. A full-body scanner system comprising the system of claim 1.

* * * * *